US 9,551,308 B2

United States Patent
Underwood et al.

(10) Patent No.: US 9,551,308 B2
(45) Date of Patent: Jan. 24, 2017

(54) MOUNTING BRACKET FOR FUEL FILTER

(71) Applicant: Caterpillar Inc., Peoria, IL (US)

(72) Inventors: Jay S. Underwood, West Lafayette, MN (US); Colin A. Hawkins, Lafayette, IN (US); Sravan K. Venne, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/016,274

(22) Filed: Feb. 5, 2016

(65) Prior Publication Data

US 2016/0153411 A1  Jun. 2, 2016

(51) Int. Cl.
| | | |
|---|---|---|
| *F02M 37/22* | (2006.01) | |
| *B01D 27/08* | (2006.01) | |
| *F02M 37/14* | (2006.01) | |
| *B01D 35/30* | (2006.01) | |
| *B01D 35/02* | (2006.01) | |
| *F02M 37/00* | (2006.01) | |
| *F02B 77/00* | (2006.01) | |

(52) U.S. Cl.
CPC .............. *F02M 37/22* (2013.01); *B01D 27/08* (2013.01); *B01D 35/02* (2013.01); *B01D 35/306* (2013.01); *F02B 77/00* (2013.01); *F02M 37/0047* (2013.01); *F02M 37/14* (2013.01); *B01D 2201/4023* (2013.01)

(58) Field of Classification Search
CPC .... F02M 37/22; F02M 37/14; F02M 37/0047; B01D 35/306; B01D 2201/4023; B01D 27/08

USPC .................................................... 248/213.2
See application file for complete search history.

(56) References Cited

U.S. PATENT DOCUMENTS

| | | | |
|---|---|---|---|
| 5,327,862 A | 7/1994 | Bedi | |
| 5,474,676 A | 12/1995 | Janik et al. | |
| 6,468,055 B1 | 10/2002 | Purcell et al. | |
| 7,168,414 B2 * | 1/2007 | Harvey | F02M 37/0047 123/509 |
| 9,010,717 B2 * | 4/2015 | Kallurwar | B01D 35/30 248/200 |
| 2006/0157391 A1 * | 7/2006 | Astle | B01D 27/101 210/85 |

(Continued)

FOREIGN PATENT DOCUMENTS

| | | | |
|---|---|---|---|
| CN | 203769992 | 3/2014 | |
| DE | 2834007 B1 * | 7/2004 | ............ B01D 35/30 |

(Continued)

*Primary Examiner* — Eret McNichols

(57) ABSTRACT

A bracket for mounting a multi-compartment fuel filter assembly to an internal combustion engine is provided. The bracket includes a base plate, a first plate, a second plate, a third plate, a plurality of mounting members, a first plurality of ribs and a second plurality of ribs. The first plate and the second plate are coupled to the base plate, and are perpendicular to the base plate. The third plate is coupled to the first plate and is parallel to the base plate. The plurality of mounting members is coupled to the first plate and the first plurality of ribs is coupled to the base plate, the first plate and the third plate, and disposed perpendicular to the base plate. The second plurality of ribs is coupled to the base plate, the first plate, and the second plate, and disposed perpendicular to the base plate.

1 Claim, 4 Drawing Sheets

(56) References Cited

U.S. PATENT DOCUMENTS

| | | | |
|---|---|---|---|
| 2009/0236277 A1* | 9/2009 | Kurth | C02F 9/005 210/234 |
| 2013/0037473 A1* | 2/2013 | Conques | B01D 35/30 210/232 |
| 2015/0209699 A1 | 7/2015 | Morris et al. | |
| 2016/0181887 A1* | 6/2016 | Underwood | H02K 5/24 248/675 |

FOREIGN PATENT DOCUMENTS

| | | | | |
|---|---|---|---|---|
| DE | 102005012546 | * | 9/2006 | F02M 37/0011 |
| DE | 102013209130 | * | 11/2013 | F02M 37/22 |
| EP | 0658362 B1 | * | 11/1998 | B01D 27/08 |
| EP | 1092862 A1 | * | 4/2001 | B01D 35/26 |
| EP | 2298430 B1 | * | 3/2013 | B01D 29/96 |
| KR | 20120125926 | | 11/2012 | |
| WO | WO 03072220 A8 | * | 11/2004 | B01D 35/301 |
| WO | 2014109966 | | 7/2014 | |
| WO | WO 2015192862 A1 | * | 12/2015 | B01D 27/08 |

\* cited by examiner

MOUNTING BRACKET FOR FUEL FILTER

TECHNICAL FIELD

The present disclosure relates to a bracket, and more specifically, to a bracket for mounting a multi-compartment fuel filter assembly to an oil pan of an internal combustion engine.

BACKGROUND

Internal combustion engines generally have a fuel filter connected to a fuel line extending between a fuel tank and a fuel intake. The purpose of the fuel filters is to remove any impurities from the fuel before introducing the fuel into the fuel intake of the internal combustion engine. Typically, the fuel filters are mounted directly onto the internal combustion engine near a fuel pump using a specifically designed support bracket. Typically, the fuel filter is fastened to the support bracket which is in turn fastened to the internal combustion engine.

Large internal combustion engines, such as engines for powering construction and mining machinery, produce vibrations during the operation of the internal combustion engine. As the support bracket is directly mounted on to the internal combustion engine, the support bracket and the fuel filter also vibrate with the internal combustion engine. Continuous vibrations from the internal combustion engine generate high level of stress concentrations around the support bracket, which results into cracking and bending of the support bracket. Additionally, the fuel filters have to be held in upright position to achieve the maximum filter efficiency. However, the vibrations produced by the internal combustion engine causes dislocation of the fuel filters, thereby reducing the filter efficiency. A failure of the support bracket leads to engine downtime and costly repairs. Thus, there is a need of an improved arrangement for mounting fuel filter to the internal combustion engine which does not result in failure of the support bracket.

U.S. Pat. No. 5,327,862 relates to an oil filter unit mounting adapter. The oil filter unit mounting adapter is connected to an internal combustion engine either directly or via a filter mounting boss. The filter mounting adapter is designed to permit the sealing, releasable attachment of a suitable oil filter unit thereto. The oil filter unit mounting adapter further includes a sandwich adapter having a first face adapted to sealingly contact the filter mounting boss on the internal combustion engine. The sandwich adapter also has a second face adapted to sealingly connect with the oil filter unit. Typically, this type of oil filter unit mounting adapter is suitable for mounting an oil filter and is not designed for mounting fuel filters. Also, the oil filter unit mounting adapter is designed for single compartment oil filter, and is not usable for a multi-compartment fuel filter assembly which is typically present in large internal combustion engines. Thus, there is a need of an improved bracket for mounting the multi-compartment fuel filter assembly, which does not fail during an operation of the engine.

SUMMARY OF THE DISCLOSURE

In one aspect of the present disclosure, a bracket for mounting a multi-compartment fuel filter assembly to an internal combustion engine is provided. The bracket includes a base plate having a first end, a second end, a first surface and a second surface. The bracket further includes a first plate, a second plate, a third plate, a plurality of mounting members, a first plurality of ribs and a second plurality of ribs. The first plate is coupled to the base plate at the first surface of the base plate. The first plate is disposed at a first predetermined distance from the first end of the base plate, and is perpendicular to the base plate. The first plate further has a third surface and a fourth surface. The second plate is coupled to the base plate at the first surface of the base plate. The second plate is disposed at the second end of the base plate, is perpendicular to the base plate. The third plate is coupled to the first plate at the third surface of the first plate. The third plate is disposed at a second predetermined distance from the first surface of the base plate, and is parallel to the base plate. The plurality of mounting members is coupled to the first plate at the fourth surface of the first plate, and the plurality of mounting members is adapted to mount the multi-compartment fuel filter assembly to the bracket. The first plurality of ribs is coupled to the base plate, the first plate and the third plate. The first plurality of ribs is perpendicular to the base plate. The second plurality of ribs is coupled to the base plate, the first plate and the second plate. The second plurality of ribs is perpendicular to the base plate. The base plate is further fastened to an oil pan of the internal combustion engine for mounting the multi-compartment fuel filter assembly to the internal combustion engine.

Other features and aspects of this disclosure will be apparent from the following description and the accompanying drawings.

DETAILED DESCRIPTION

Figure 1:
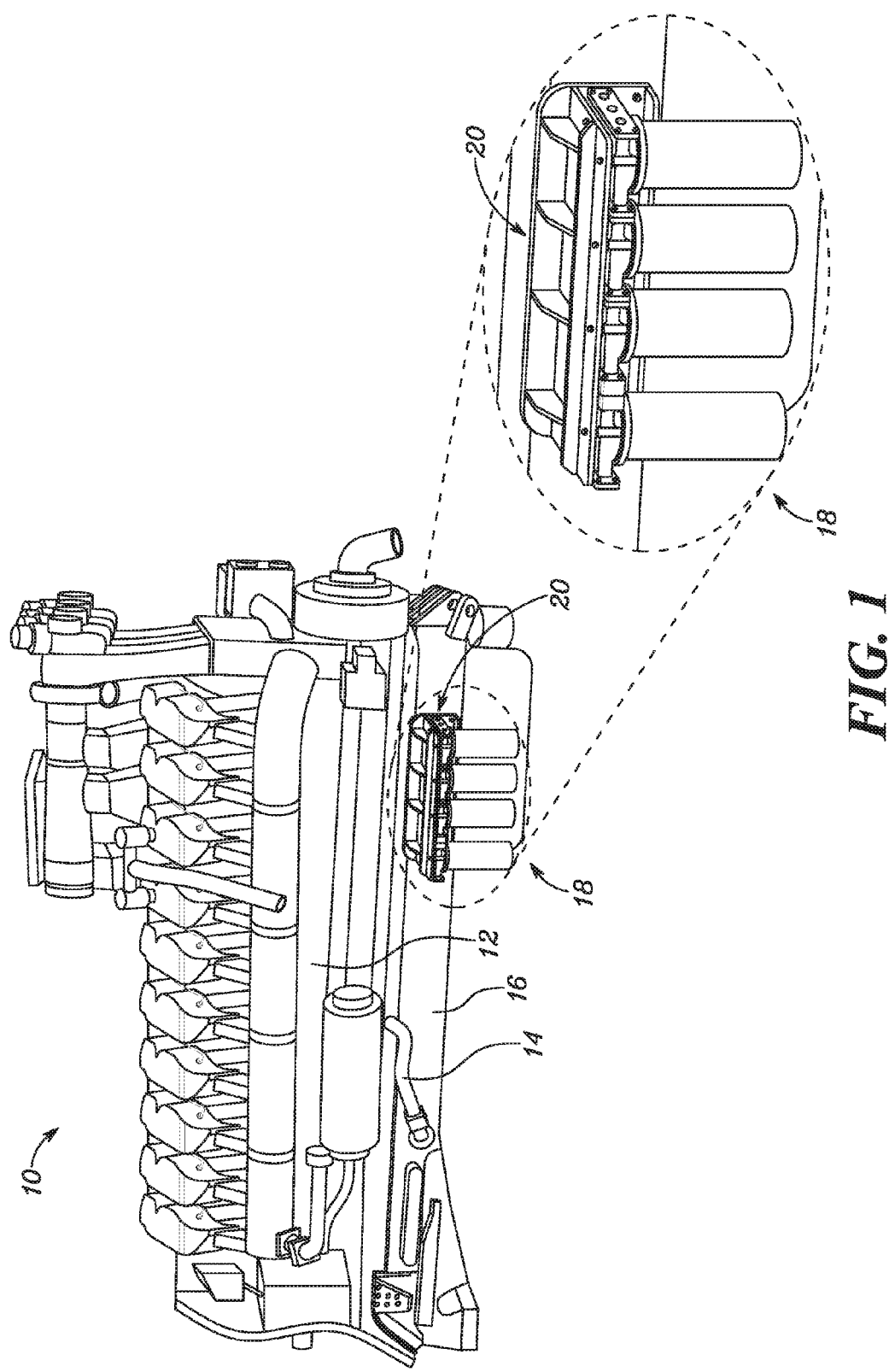
FIG. 1 is a perspective view of an internal combustion engine along with a detailed view of a bracket for mounting a multi-compartment fuel filter assembly shown in accordance with the concepts of the present disclosure.

Referring to FIG. 1, an internal combustion engine 10 includes an engine block 12, an oil tube 14, an oil pan 16, a multi-compartment fuel filter assembly 18 and a bracket 20. The internal combustion engine 10 includes other components such as, a fuel intake, an exhaust system, rails for mounting, etc. For the purpose of simplicity, various other components of the internal combustion engine 10 are not labeled in FIG. 1. The bracket 20 is used to mount the multi-compartment fuel filter assembly 18 on the internal combustion engine 10. The multi-compartment fuel filter assembly 18 is used to filter the impurities from the fuel before introducing the fuel into a fuel intake of the internal combustion engine 10.

Figure 2:
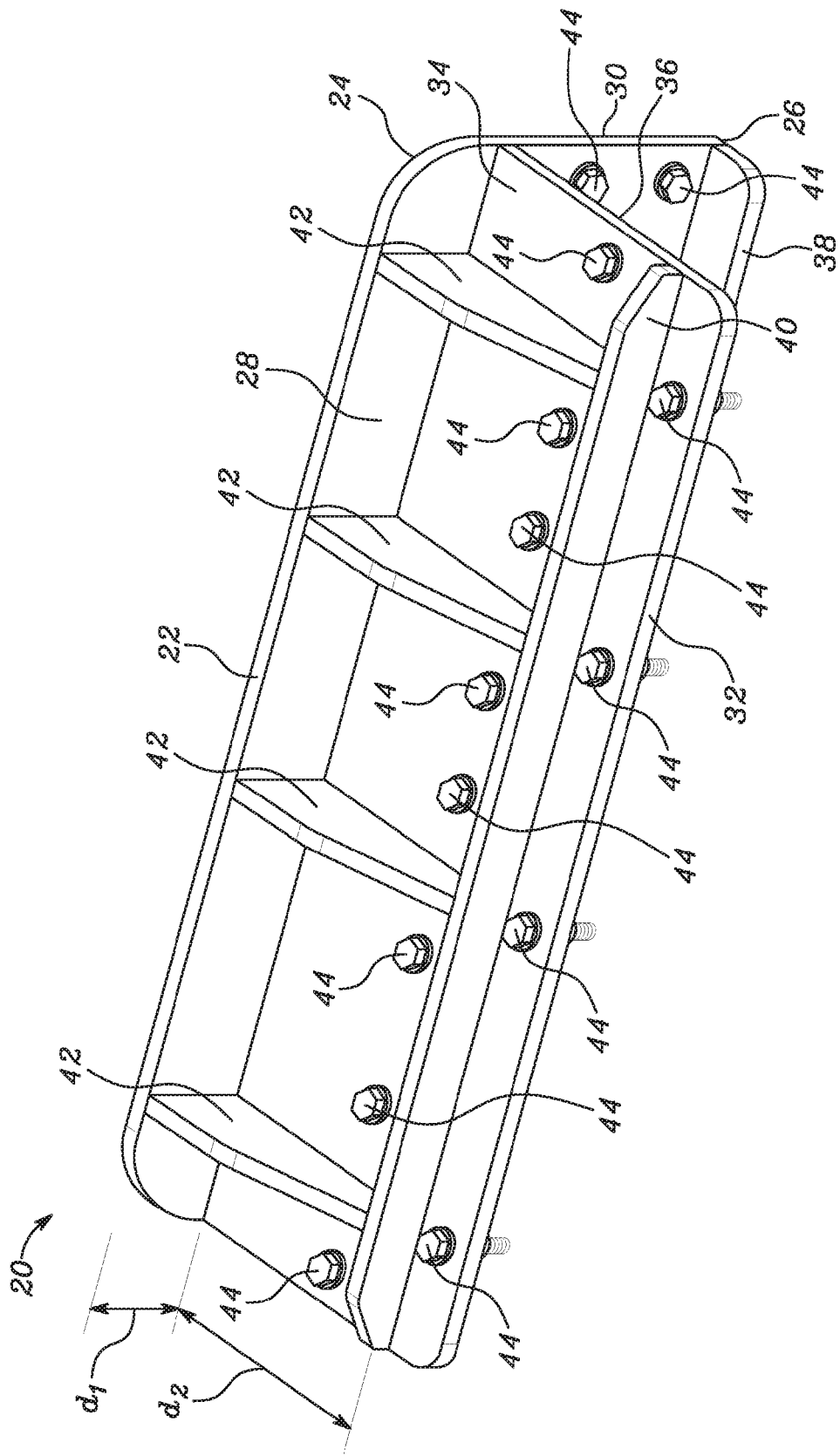
FIG. 2 is a perspective view of the bracket for mounting the multi-compartment fuel filter assembly shown in accordance with the present disclosure.

Referring to FIG. 2, the bracket 20 for mounting the multi-compartment fuel filter assembly 18 (FIG. 1) to the internal combustion engine 10 (FIG. 1) includes a base plate 22 having a first end 24, a second end 26, a first surface 28 and a second surface 30. The bracket 20 further includes a first plate 32 having a third surface 34 and a fourth surface 36, a second plate 38, and a third plate 40. The first plate 32 is coupled to the base plate 22 at the first surface 28 of the base plate 22. The first plate 32 is disposed at a first predetermined distance $d_1$ from the first end 24 of the base plate 22, and is perpendicular to the base plate 22. The second plate 38 is coupled to the base plate 22 at the first surface 28 of the base plate 22. The second plate 38 is disposed at the second end 26 of the base plate 22, and is perpendicular to the base plate 22. The third plate 40 is coupled to the first plate 32 at the third surface 34 of the first plate 32. The third plate 40 is disposed at a second predetermined distance $d_2$ from the first surface 28 of the base plate 22, and is parallel to the base plate 22.

The bracket 20 further includes a first plurality of ribs 42. The first plurality of ribs 42 is coupled to the base plate 22, the first plate 32 and the third plate 40. The first plurality of ribs 42 is perpendicular to the base plate 22. Additionally, the bracket 20 includes fasteners 44. The fasteners 44 are used to mount multi-compartment fuel filter assembly 18 (FIG. 1) to the first plate 32. On the other hand, the fasteners 44 are used to fasten the base plate 22 to a surface of the oil pan 16 of the internal combustion engine 10, thereby, mounting the multi-compartment fuel filter assembly 18 to the internal combustion engine 10.

Figure 3:
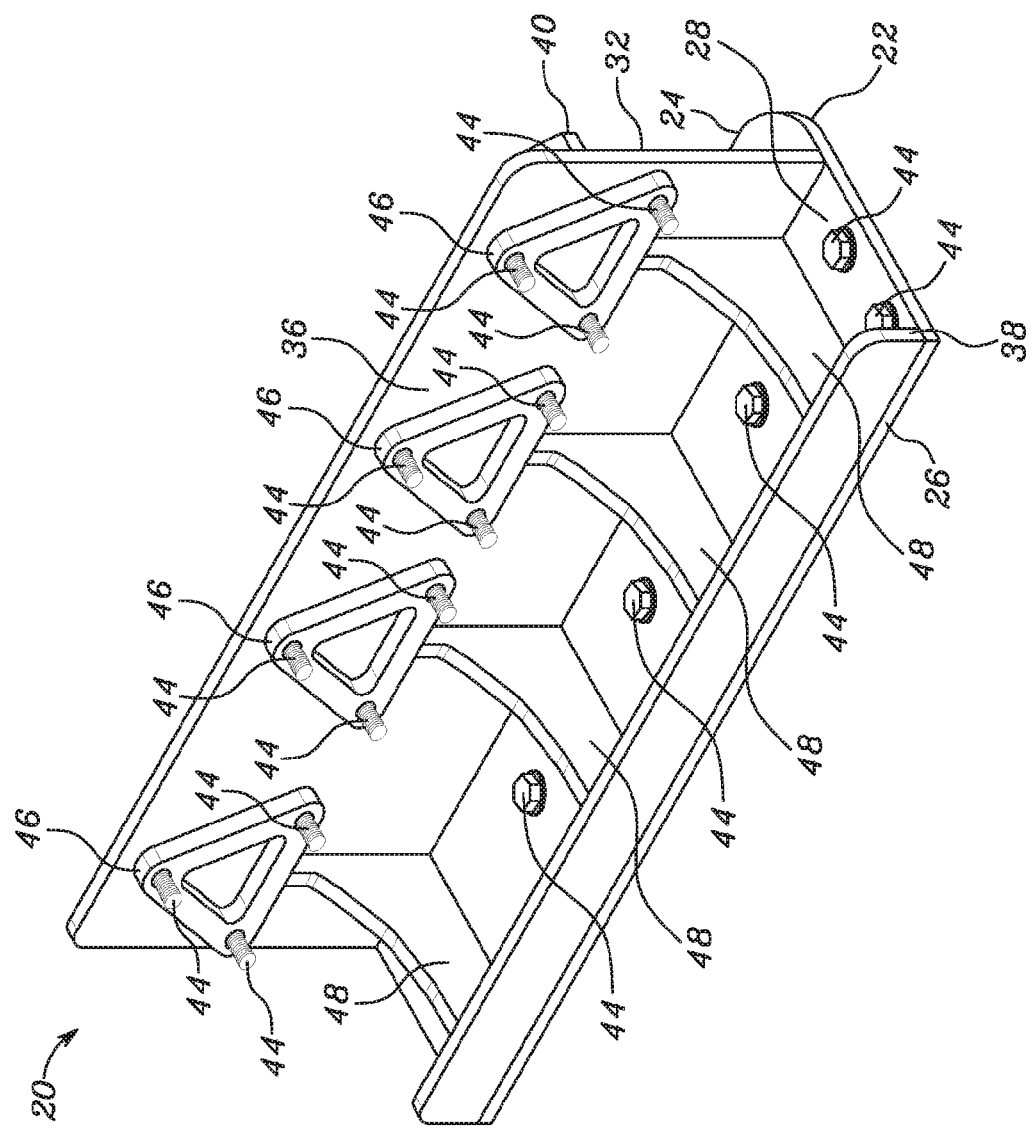
FIG. 3 is a bottom perspective view of the bracket including mounting members for mounting the multi-compartment fuel filter assembly shown in accordance with the present disclosure.
Figure 4:
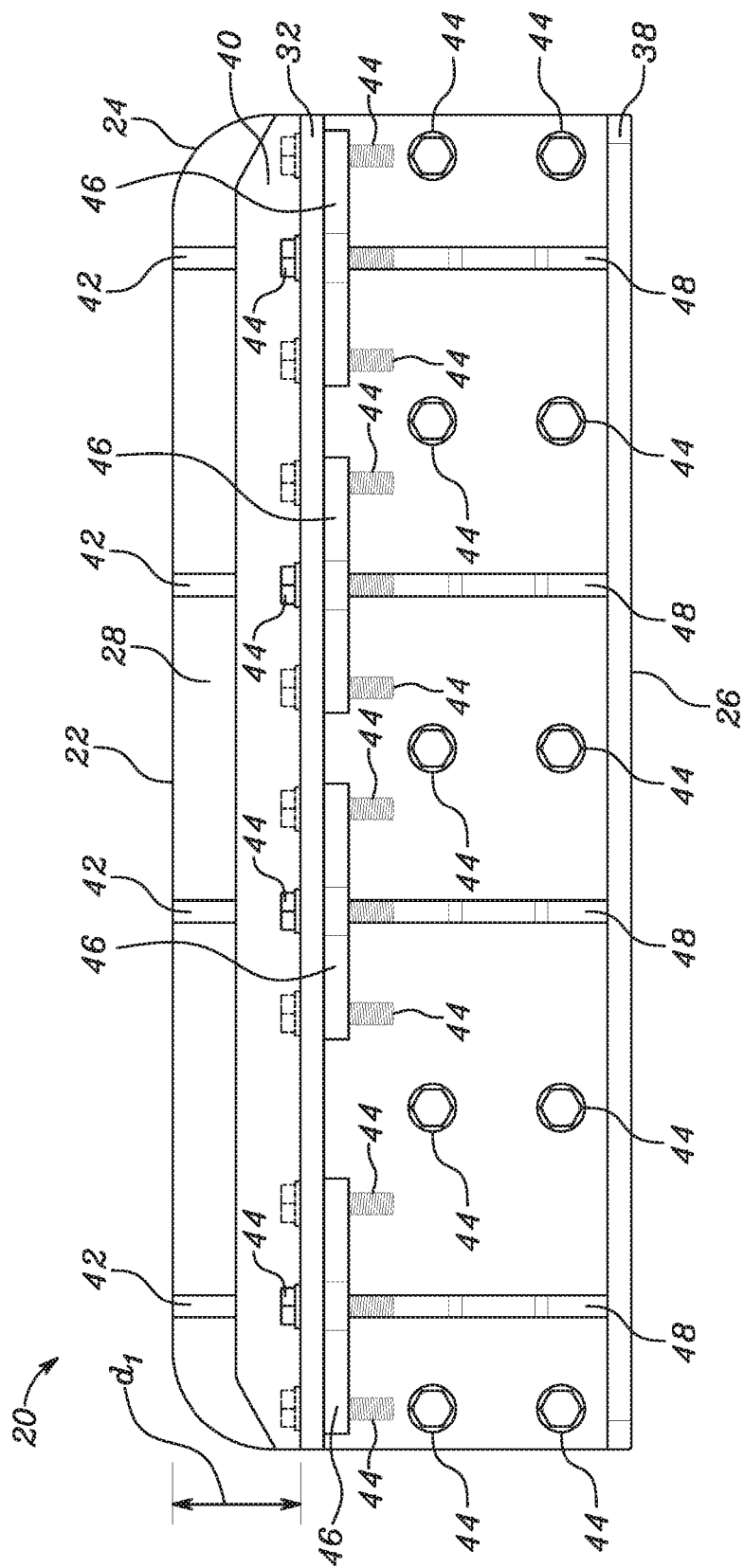
FIG. 4 is a front view of the bracket for mounting the multi-compartment fuel filter assembly shown in accordance with the present disclosure.

Referring to FIG. 3 and FIG. 4, the bracket 20 further includes a plurality of mounting members 46. The plurality of mounting members 46 is coupled to the fourth surface 36 of the first plate 32. The plurality of mounting members 46 is adapted to mount the multi-compartment fuel filter assembly 18 (FIG. 1) to the bracket 20 using the fasteners 44. Additionally, the bracket 20 includes a second plurality of ribs 48. The second plurality of ribs 48 is coupled to the base plate 22, the first plate 32 and the second plate 38. The second plurality of ribs 48 is perpendicular to the base plate 22, and has a predetermined shape.

It will be apparent to one skilled in art that although a shape of the plurality of mounting members 46 is shown to be triangular, the plurality of mounting members 46 may have any other suitable shape. Further, the second plurality of ribs 48 may have any suitable shape that allows a proper mounting of the multi-compartment fuel filter assembly 18 (FIG. 1). Also, a material of construction of the bracket 20 includes, but not limited to, steel, stainless steel, iron, copper etc.

INDUSTRIAL APPLICABILITY

Referring to FIG. 1, an internal combustion engine 10 has the multi-compartment fuel filter assembly 18 to remove impurities from the fuel before introducing the fuel into the fuel intake of the internal combustion engine 10. Typically, the multi-compartment fuel filter assembly 18 is mounted directly onto the internal combustion engine 10 near a fuel pump using a specifically designed support bracket. As the support bracket is directly mounted on to the internal combustion engine 10, the support bracket and the multi-compartment fuel filter assembly 18 also vibrate with the internal combustion engine 10. However, the bracket 20 is able to withstand the continuous vibrations from the internal combustion engine 10 which does not results into cracking and bending of the bracket 20.

Referring to FIG. 2, the present disclosure provides the bracket 20 including a base plate 22, a first plate 32, a second plate 38 and a third plate 40. The bracket 20 is mounted to the oil pan 16 of the internal combustion engine 10 via the base plate 22. As the bracket 20 is not directed mounted on the internal combustion engine 10, but on the oil pan 16 of the internal combustion engine 10, the vibrations experienced by the bracket 20 and the multi-compartment fuel filter assembly 18 are lower, thereby, increasing the life of the bracket 20 and consequently, reducing maintenance requirements and idle time of the internal combustion engine 10. Also, due to fewer vibrations, the multi-compartment fuel filter assembly 18 is held in upright position, thereby preventing a reduction in the filter efficiency of the multi-compartment fuel filter assembly 18.

Referring to FIG. 2 and FIG. 3, the first plurality of ribs 42 and the second plurality of ribs 48 provide structural rigidity to the bracket 20 and prevent the buckling of the first plate 32, thereby, making the design of the bracket 20 robust.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A bracket for mounting a multi-compartment fuel filter assembly to an internal combustion engine, the bracket comprising:

a base plate having a first end, a second end, a first surface and a second surface;

a first plate coupled to the base plate at the first surface, the first plate being disposed at a first predetermined distance from the first end of the base plate, and being perpendicular to the base plate, the first plate having a third surface and a fourth surface;

a second plate coupled to the base plate at the first surface, the second plate being disposed at the second end of the base plate, and being perpendicular to the base plate;

a third plate coupled to the first plate at the third surface, the third plate being disposed at a second predetermined distance from the first surface of the base plate and being parallel to the base plate;

a plurality of mounting members coupled to the first plate at the fourth surface of the first plate, the plurality of mounting members adapted to mount the multi-compartment fuel filter assembly to the bracket;

a first plurality of ribs coupled to the base plate, the first plate and the third plate, the first plurality of ribs being perpendicular to the base plate; and a second plurality of ribs coupled to the base plate, the first plate and the second plate, the second plurality of ribs being perpendicular to the base plate;

wherein the base plate is fastened to an oil pan of the internal combustion engine for mounting the multi-compartment fuel filter assembly to the internal combustion engine.

* * * * *